United States Patent

Matoba et al.

[11] Patent Number: 5,829,105
[45] Date of Patent: Nov. 3, 1998

[54] COUPLER FOR ELONGATE ARTICLE

[75] Inventors: Hiroshi Matoba, Toyama; Yoshinobu Takahashi, Uozu; Ryukichi Murai, Toyama; Hirokazu Watanabe, Kurobe, all of Japan

[73] Assignee: YKK Corporation, Tokyo, Japan

[21] Appl. No.: 891,225

[22] Filed: Jul. 10, 1997

Related U.S. Application Data

[62] Division of Ser. No. 667,231, Jun. 19, 1996, Pat. No. 5,689,860.

[30] Foreign Application Priority Data

Jun. 22, 1995 [JP] Japan .................................. 7-180894

[51] Int. Cl.⁶ .................................................. A44B 21/00
[52] U.S. Cl. .............................. 24/115 F; 24/3.4; 24/335; 24/459
[58] Field of Search .............................. 24/115 F, 115 M, 24/3.4, 597, 602, 684, 598.4, 265 H, 545, 370, 335, 339, 3.3, 115 L, 136 R, 136 L; 119/14.1, 770, 776, 777

[56] References Cited

U.S. PATENT DOCUMENTS

| | | |
|---|---|---|
| 1,466,495 | 8/1923 | Watson . |
| 3,229,998 | 1/1966 | Pennington ................................ 24/459 |
| 3,422,502 | 1/1969 | McCarthy . |
| 3,833,776 | 9/1974 | Wampfler et al. . |
| 3,834,061 | 9/1974 | Klein . |
| 4,536,924 | 8/1985 | Willoughby . |
| 4,733,625 | 3/1988 | Allen . |
| 4,771,516 | 9/1988 | Foth ............................................ 24/459 |
| 4,881,492 | 11/1989 | Jones . |
| 4,900,184 | 2/1990 | Cleveland . |
| 5,027,477 | 7/1991 | Seron . |
| 5,122,007 | 6/1992 | Smith . |
| 5,195,217 | 3/1993 | Arntzen . |
| 5,350,092 | 9/1994 | Hollis . |
| 5,365,641 | 11/1994 | Watanabe et al. ..................... 24/136 R |
| 5,414,903 | 5/1995 | Porteous . |
| 5,463,799 | 11/1995 | Graham . |
| 5,473,796 | 12/1995 | Fusillo . |
| 5,497,537 | 3/1996 | Robinson et al. . |

FOREIGN PATENT DOCUMENTS

| | | |
|---|---|---|
| 41 05 667 A1 | 9/1991 | Germany . |
| 7-9114 | 2/1995 | Japan . |

*Primary Examiner*—Victor N. Sakran
*Attorney, Agent, or Firm*—Hill & Simpson

[57] ABSTRACT

An elongate article coupler comprises a pair of fitting parts for severally retaining end parts of the elongate articles and a connecting part disposed between the fitting parts and adapted to interconnect the fitting parts, the connecting part having a breaking part adapted to be broken under a tension exceeding a prescribed level. In accordance with one embodiment of the modification, the coupler comprises a pair of fitting parts each including one of a pair of engaging parts adapted to form mutual engagement and break the engagement under a tension exceeding a prescribed level. In accordance with another modification, the coupler comprises one or more of fitting parts and retention cancelling means adapted to induce retention of the elongate article in cooperation with the fitting parts and cancel the retention of the elongate article when a tension exceeding a prescribed level is exerted on the elongate article.

7 Claims, 14 Drawing Sheets

COUPLER FOR ELONGATE ARTICLE

This is a division of application Ser. No. 08/667,231, filed Jun. 19, 1996 now U.S. Pat. No. 5,689,860.

BACKGROUND OF THE INVENTION

1. Field of the Invention

This invention relates to an elongate article coupler for fastening cords and belts provided on apparels and bags and for coupling ends of elongate articles such as tapes.

2. Description of the Prior Art

It has been customary for such elongate articles as, for example, cords which are provided on bags and other pouches to be used more often than not as hung down from users' necks. They have had the possibility of compressing users' necks when they are accidentally caught on somethings rigid lying nearby. To prevent this dreadful situation, therefore, an idea of looping plastic covers one each around the opposite end parts of a cord, squeezing the looped plastic covers on the end parts of the cord tightly to a small diameter, and forcing the opposite end parts of the cord tightened with the looped plastic covers toward each other in a tubular connector until they are connected therein has been proposed as disclosed in published Japanese U.M. Application, KOKAI (Early Publication) No. 7-9,114. The cord which has the opposite end parts thereof coupled through the medium of this connector, on exposure to an unduly forceful pull, causes the connector to let go the end parts thereof inserted therein. The cord, therefore, is enabled to avoid an unforeseeable situation which would occur when a pull was given somehow or other to the cord.

The conventional elongate article coupler mentioned above must attach covers to the opposite end parts of a cord being coupled and then squeeze them tightly into a small diameter and, therefore, experience an increase in the number of steps of work in the process of assemblage. Moreover, it never allows use of an ordinary cord in its unprepared form. Since the force with which the opposite end parts of a cord are inserted into the tubular connector lacks uniformity and the force with which the cord is pulled out of the connector varies with the lengths of the end parts inserted into the connector, the coupler has incurred difficulty in joining the end parts so that they may be separated with a fixed magnitude of force.

SUMMARY OF THE INVENTION

The present invention, produced in consideration of the problems of the prior art mentioned above, has for an object thereof the provision of an elongate article coupler which produces no marked dispersion in the force with which the opposite end parts of an elongate article are joined or disjoined, avoids discriminating an elongate article on account of the kind thereof, and accepts an elongate article in its unprepared state for the purpose of coupling.

It is another object of the present invention to provide a coupler which retains fast the opposite end parts of an elongate article in their unprepared state and allows the coupled end parts of the elongate article to be separated only when a tension exceeding a prescribed level is exerted on the elongate article.

According to the present invention, there is provided an elongate article coupler which comprises a pair of fitting parts each for retaining fast the end part of an elongate article and a connecting part interposed between the fitting parts and adapted to couple the fitting parts, the connecting part having a breaking part adapted to be broken on exposure to a tension exceeding a prescribed level. Preferably the connecting part has a constricted part adapted to serve as the breaking part. In one embodiment each fitting part comprises an upper member and a lower member, each member having an aligned cavity extending from one end to the other end thereof. A gap for receiving the end part of the elongate article is defined by opposing surfaces of the cavities of the upper and lower members. The upper member and the lower member may be swingably interconnected at one lateral end thereof and closed toward each other by means of snap engagement. Alternatively, the upper member may be resiliently fixed to the lower member at one lateral end thereof so as to leave a prescribed gap between them. Preferably one or more of the opposing surfaces of the cavities of the upper and lower members may be provided with pointed teeth or needle-shaped projections to enhance the retaining of the elongate article in the fitting part. In another embodiment the fitting parts may be integrally molded with the elongate article by means of the insert molding.

The elongate article coupler of the present invention has the breaking part formed in the connecting part as described above and, therefore, permits infallible separation of the connecting part under a tension of a prescribed magnitude. Since the tension required for causing the breakage is constant and free from dispersion, the breakage can be obtained infallibly. The elongate article for which the coupler is used requires no special preparation or treatment. The elongate article coupler, therefore, can be used on ordinary cords, belts, etc. in its unprepared form.

The elongate article coupler may be provided with separable engagement means or fastener means that is adapted to connect or disconnect the pair of fitting parts each other. In this modification, when the fitting parts happen to be disconnected, it can be engaged again with the engagement means and is utilized repeatedly.

In accordance with one embodiment of this modification, there is provided an elongate article coupler which comprises a pair of fitting parts each for retaining the end part of an elongate article, each of the fitting parts including one of a pair of engaging parts adapted to form mutual engagement and break engagement on exposure to a tension exceeding a prescribed level. Preferably the pair of engaging parts are comprised of congruently shaped protrusions and one or more of holes cooperatively disposed on the opposing surfaces of the fitting parts.

In accordance with another embodiment of the modification, there is provided an elongate article coupler which comprises one or more of fitting parts for retaining the end part of an elongate article and retention cancelling means for enabling the fitting parts to retain fast the elongate article and cancel the retention of the elongate article on exposure to a tension exceeding a prescribed level.

BRIEF DESCRIPTION OF THE DRAWINGS

Other objects, features, and advantages of the invention will become apparent from the following description taken together with the drawings, in which:

FIGS. 2 through 4 are respectively a front view, a plan view, and a right side view of the coupler of FIG. 1 as posed in a closed state, wherein FIG. 3 shows a cord clamped therein;

FIGS. 7 through 10 are respectively a perspective view, a front view, a plan view, and a right side view of the second embodiment of the elongate article coupler of the present invention, wherein FIG. 9 shows the cord clamped therein;

DETAILED DESCRIPTION OF THE PREFERRED EMBODIMENTS

Figure 1:
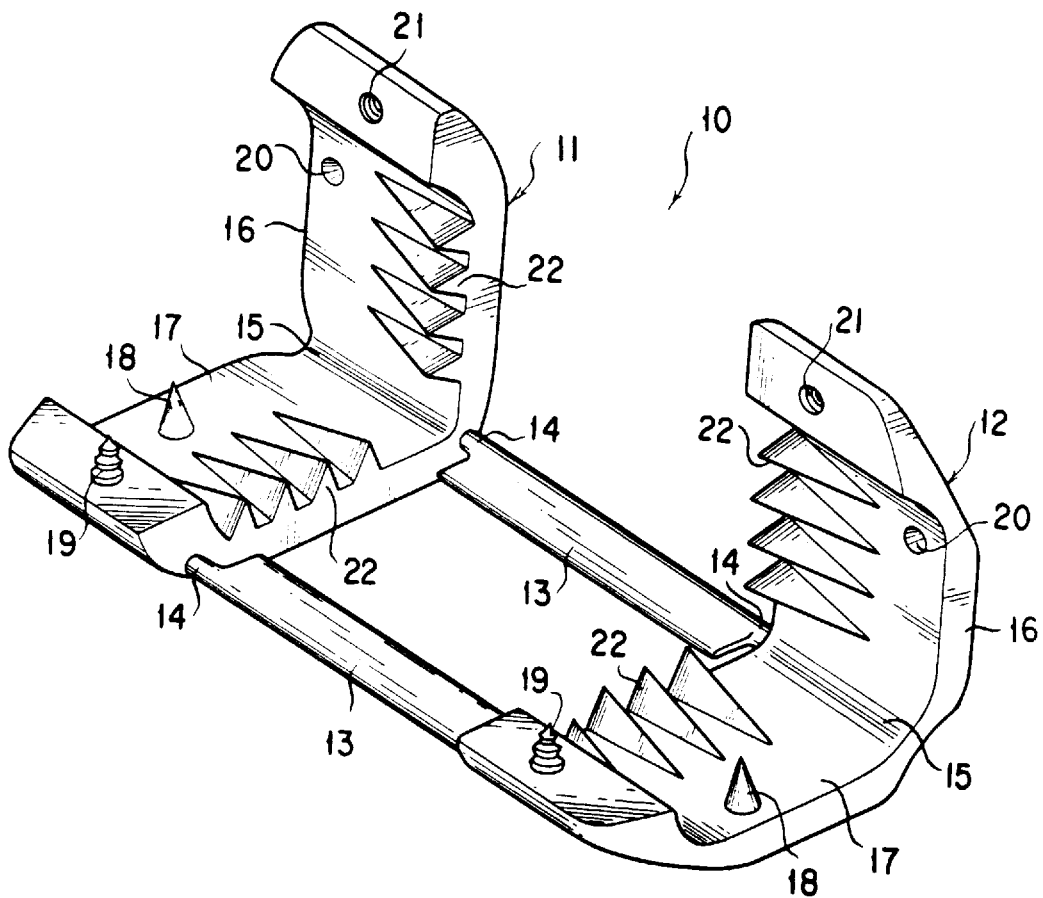
FIG. 1 is a perspective view of the first embodiment of the elongate article coupler of the present invention as posed in an opened state.
Figure 2:
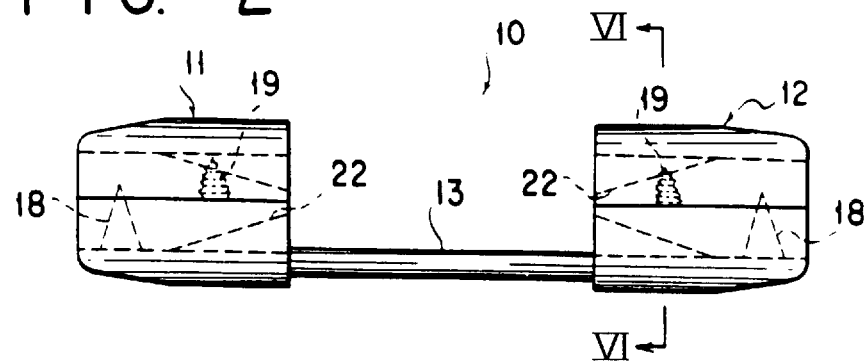
Figure 3:
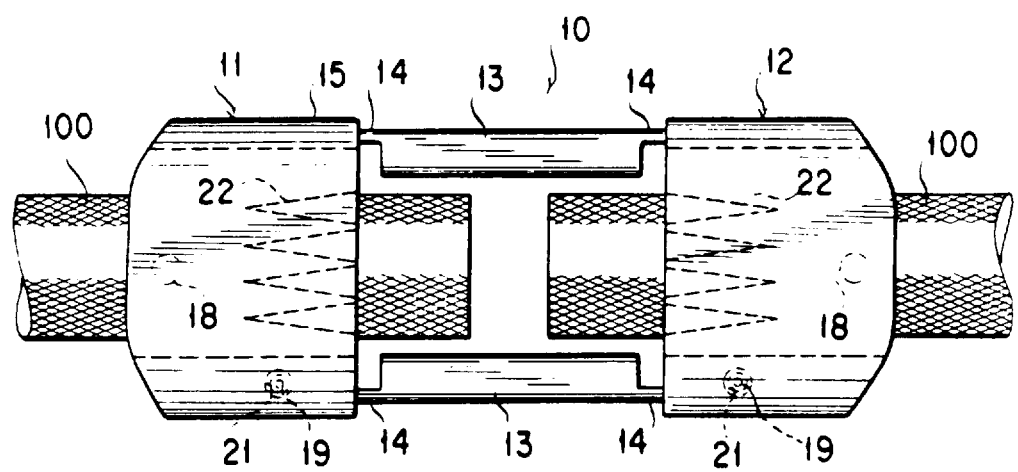
Figure 4:
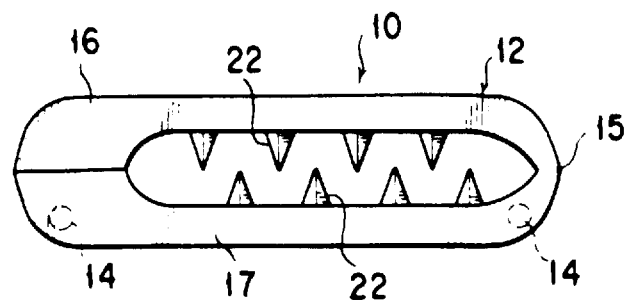

Now, preferred embodiments of the present invention will be described below with reference to the accompanying drawings. FIGS. 1 through 6 show the first embodiment of the elongate article coupler of the present invention. The elongate article coupler 10 of this embodiment has integrated in one-piece construction a pair of fitting parts 11, 12 and two rodlike connecting parts 13 serving to interconnect the fitting parts 11, 12. The fitting parts 11 and 12 form a mirror-image relationship. The same remarks hold good for the embodiments shown in FIGS. 7 through 23 and FIGS. 30, 31 which will be described herein below. The opposite end parts of each of the connecting parts 13 (the parts thereof abutting the fitting parts) are formed in such a relatively slender shape as to serve as breaking parts 14 capable of being cut by a tension exceeding a prescribed level. The fitting parts 11, 12 each comprise an upper member 16 and a lower member 17 which, as a pair, are swingably interconnected at a central thin-walled hinge part 15. On the inner sides of the upper member 16 and the lower member 17 of each pair which are destined to be opposed to each other, rows of pointed teeth 22 to be meshed in a staggering pattern with each other are formed. The pointed teeth 22 in the pair of rows each have a triangular cross section and are inclined outwardly from the inner side so that a cord nipped between the rows may not readily slip therefrom. On the inner side of the lower member 17 of each of the fitting parts 11, 12, a positioning projection 18 is formed. On the inner face of the leading end part of the lower member 17, a retaining projection 19 having a zigzagging contour is formed for the purpose of retaining the upper member 16 and the lower member 17 of each of the fitting parts 11, 12 is formed. On the inner face of the upper member 16 of each of the fitting parts 11, 12, a positioning depression 20 and a retaining depression 21 having a zigzagging groove are formed at the positions aligned respectively with those of the projection 18 and the retaining projection 19 mentioned above. The upper member 16 and the lower member 17 of each of the fitting parts 11, 12 can be closed toward each other as shown in FIG. 2 and FIG. 4 so as to give rise to an empty space available for nipping a cord.

Figure 5:
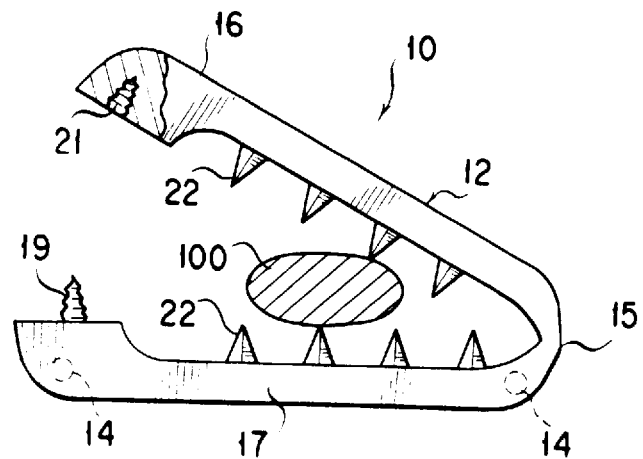
FIG. 5 is a partially sectioned right side view showing the coupler of FIG. 1 as paused during the attachment of the cord thereto.
Figure 6:
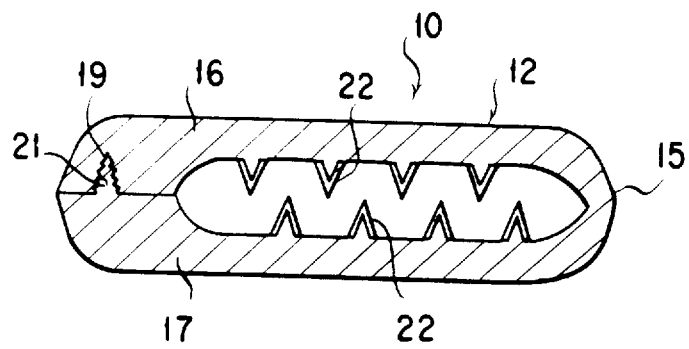
FIG. 6 is a sectional view showing the coupler of FIG. 2 taken along line 6—6.
Figure 7:
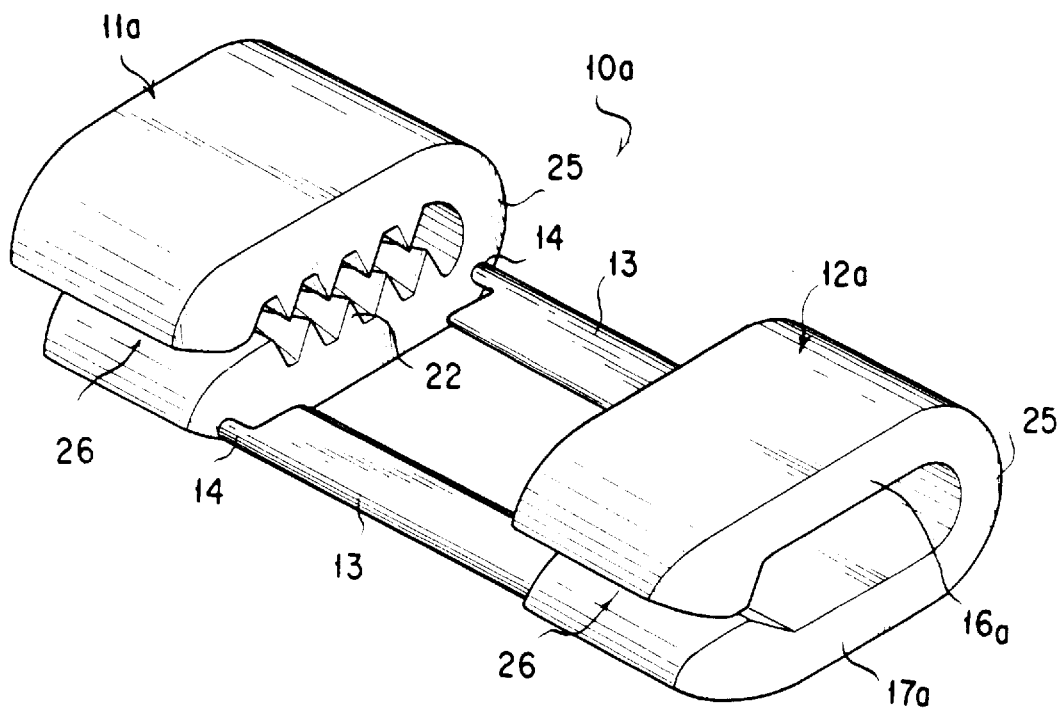
Figure 8:
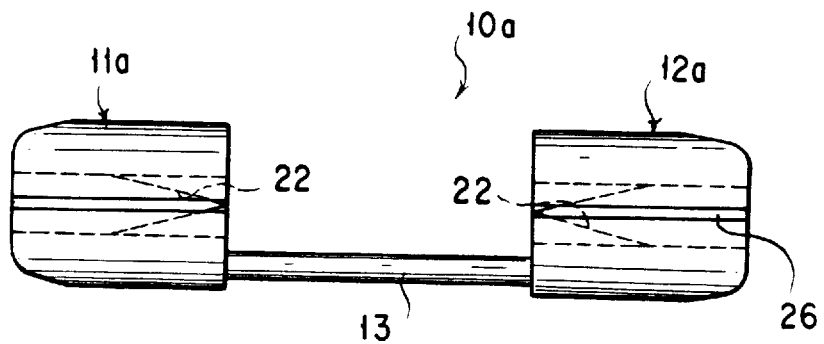
Figure 9:
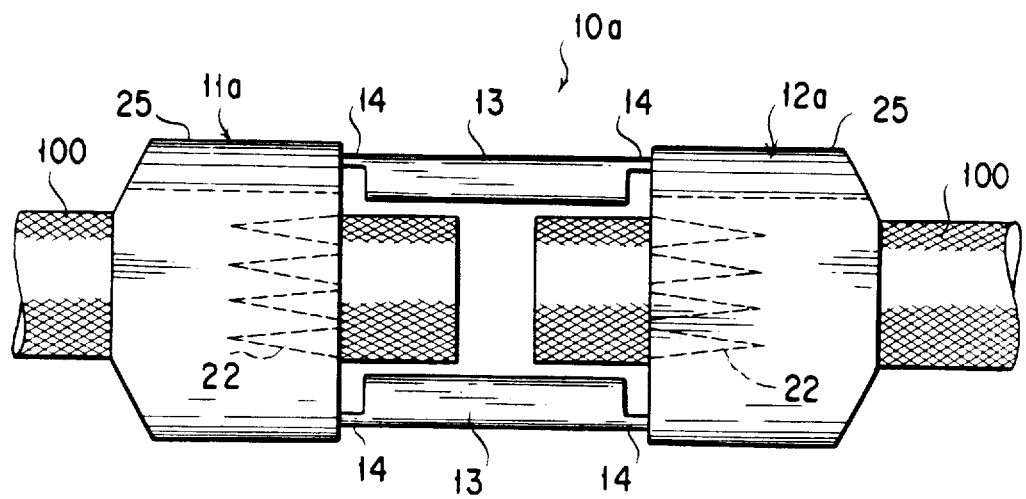
Figure 10:
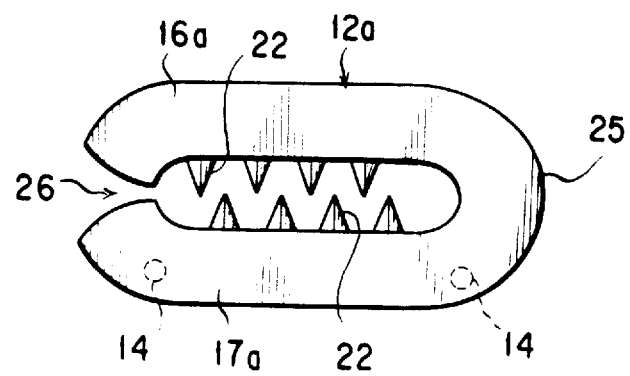

The elongate article coupler 10 of this embodiment is put to use by first passing a cord 100 through the gap between the fitting parts 11, 12, closing the upper members 16 and the lower members 17 of the fitting parts 11, 12 about the hinge part 15 as the center as shown in FIG. 5, and inserting the projections 18 into the depressions 20 and the retaining projections 19 into the depressions 21 and thereby causing the rows of pointed teeth 22 formed on the inner faces of the upper members 16 and the lower members 17 of the fitting parts 11, 12 to nip the cord 100 and fix it in position. The retaining projections 19 have a zigzagging contour and the retaining depressions 21 have an internally zigzagging contour as described above. When the upper members 16 and the lower members 17 of the fitting parts 11, 12 are closed toward each other until the retaining projections 19 are inserted home in the retaining depressions 21, the retaining projections 19 will not easily slip out of the retaining depressions 21. Thereafter, the cord 100 intervening between the pair of fitting parts 11, 12 has a cut inserted in the central part as shown in FIG. 3 to complete the operation of coupling. The cord 100 in the ensuant state is retained by the fitting parts 11, 12 with a retaining force which is greater than the breaking strength of the breaking parts 14.

The elongate article coupler of this embodiment is such that the breaking parts 14 are snapped under undue force exerted on the cord 100 and, the pair of the fitting parts 11, 12 are consequently separated from each other. Even when the cord 100 is caught on some rigid article and induced to give a pull at a user of the coupler, the cord is safely separated from the user. Since the breaking parts 14 deviate from the positions at which the cord 100 enters the coupler proper, the possibility that the cut which is formed in the cord 100 will be accidentally inflicted on the breaking parts 14 is nil. Particularly, the breaking parts 14 can be formed in a fixed thickness and, as a result, the tension required for causing a collapse of the breaking parts 14 can be set at a constant level.

Now, the second embodiment of the elongate article coupler of the present invention will be described below with reference to FIGS. 7 through 10. Here, like parts used in the first embodiment described above will be denoted by like reference numerals and will be omitted from the following description. In the elongate article coupler 10a of the present embodiment as clearly shown in FIG. 7 and FIG. 10, thick-wall elastic retaining parts 25 are formed to replace the hinge parts 15 of the first embodiment and these elastic retaining parts 25 elastically link upper members 16a and lower members 17a of fitting parts 11a, 12a and the other end parts of the upper members 16a and the lower members 17a which are opposed to each other are so formed as to retain always a closed state shown in the diagram except for gaps 26 interposed therebetween. Thus, the construction of the present embodiment is identical to that of the first embodiment, excepting the positioning projections and the depressions for admitting them and the retaining projections and the retaining depressions for admitting them are not formed.

This coupler 10a is put to use by forcibly inserting the cord 100 between the fitting parts 11a, 12a in such a manner as to pry open the gap 26, passing the cord 100 between the upper and the lower row of pointed teeth 22, and then cutting the cord 100 in the same manner as in the first embodiment between the fitting parts 11a, 12a and thereby completing the work of coupling. The present embodiment can impart a simplified shape and an exalted strength to the fitting parts 11a, 12a.

Figure 11:
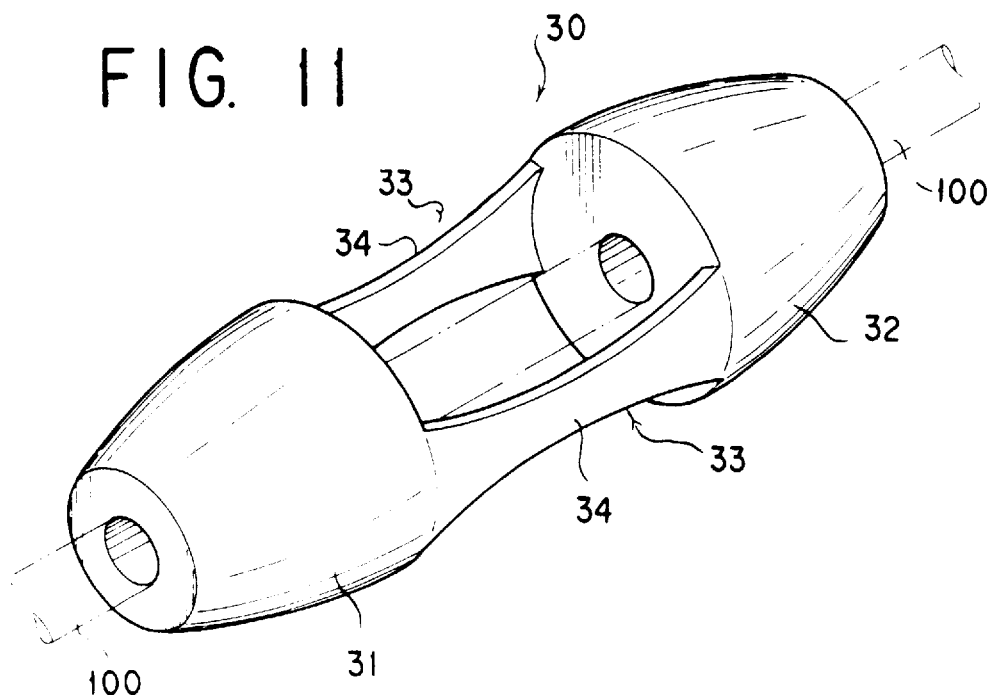
FIG. 11 is a perspective view of the third embodiment of the elongate article coupler of the present invention.
Figure 12:
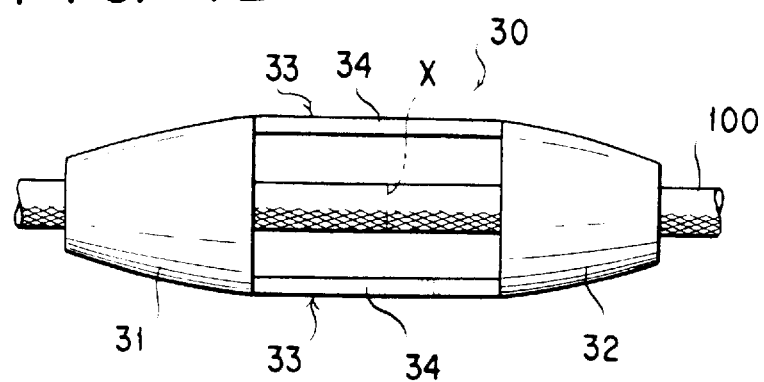
FIGS. 12 and 13 are respectively a plan view and a right side view of the coupler of FIG. 11 showing the cord attached thereto.
Figure 13:
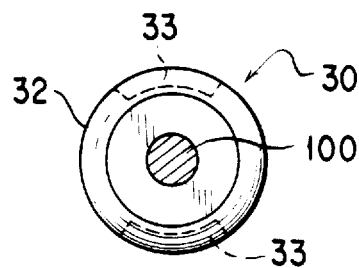

FIG. 11 to 13 depict the third embodiment of the elongate article coupler of the present invention. The elongate article coupler 30 of this embodiment is molded such that the cord 100 is inserted through the coupler 30 and this cord 100 and the coupler 30 form a one-piece integral entity (insert molding). The coupler 30 comprises cylindrically shaped fitting parts 31, 32 which have the cord 100 passed therethrough and constitute themselves two opposite end parts and a pair of connecting parts 33 which are formed between the fitting parts 31, 32 and adapted to interconnect the fitting parts 31, 32. After the coupler 30 is finally shaped, the cord 100 has a cut X inserted therein between the fitting parts 31, 32. In this elongate article coupler 30, the central part of each of the connecting parts 33 is formed in a small width and in a small wall thickness and this central part functions as a breaking part 34.

Figure 14:
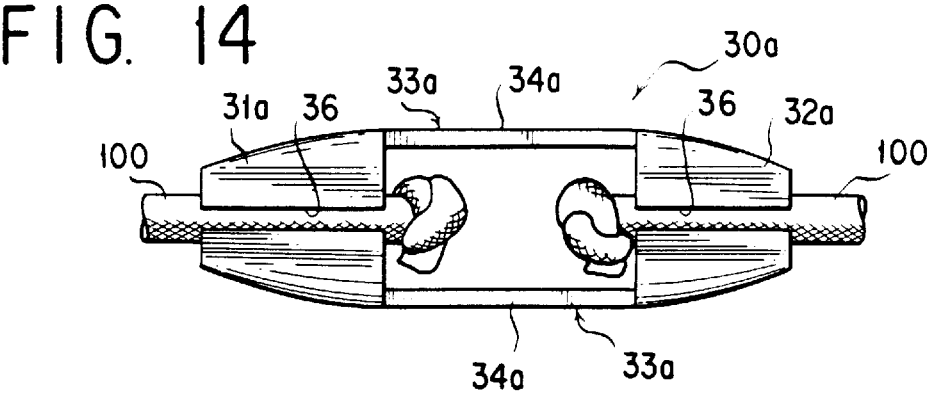
FIGS. 14 and 15 are respectively a plan view and a partially sectioned right side view of the fourth embodiment of the elongate article coupler of the present invention.
Figure 15:
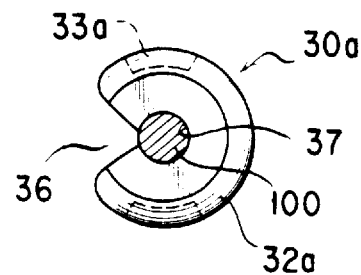

Now, the fourth embodiment of the elongate article coupler of the present invention will be described below with reference to FIGS. 14 and 15. Here, like parts used in the third embodiment described above will be denoted by like reference numerals and will be omitted from the following description. In the elongate article coupler 30a of this embodiment as shown in FIGS. 14 and 15, the coupler 30a similar in shape to that of the third embodiment described above is formed separately of the cords 100 and slits 36 are formed one each on one lateral part of each of the fitting parts 31a, 32a in the direction of insertion of the cord 100. The slits 36 allow insertion of the cords 100 therein. The cords 100 each in a state having the leading end part thereof tied into a knot are slid through the slits 36, forced into a through hole 37, and fixed so as to be engaged with the inner terminal faces of the fitting parts 31a, 32a. In the case of the elongate article coupler 30a of this embodiment, breaking parts 34a formed in connecting parts 33a in a small width and in a small wall thickness are snapped under a tension exceeding a prescribed level exerted on the cords 100 and induced to break the coupling of the cords 100 and avoid the otherwise possible occurrence of an unforeseeable situation.

Figure 16:
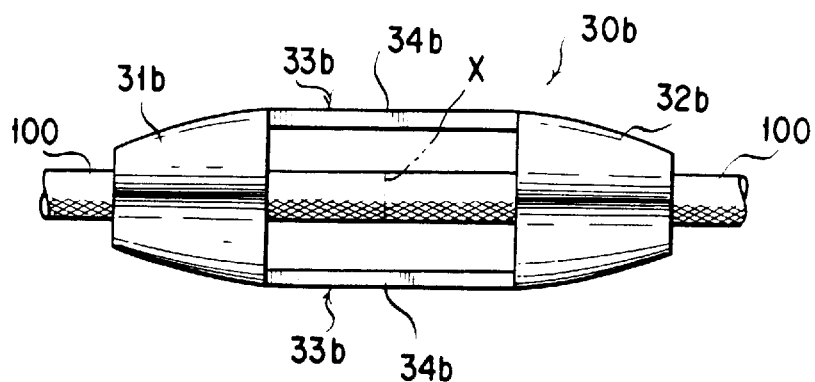
FIGS. 16 and 17 are respectively a plan view and a partially sectioned right side view of the fifth embodiment of the elongate article coupler of the present invention.
Figure 17:
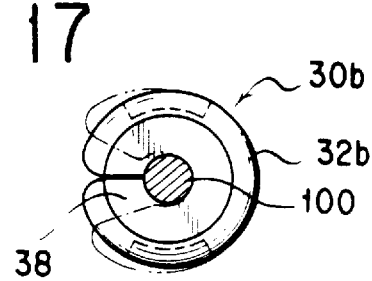
Figure 18:
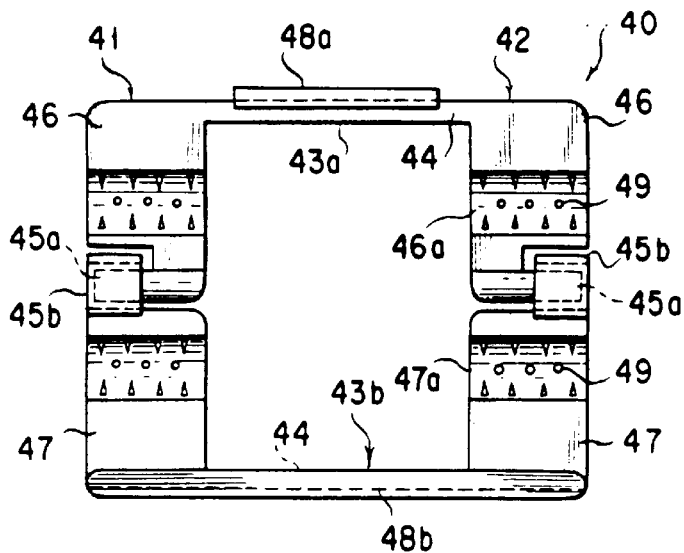
FIGS. 18 and 19 are respectively a plan view and a right side view of the sixth embodiment of the elongate article coupler of the present invention.
Figure 19:
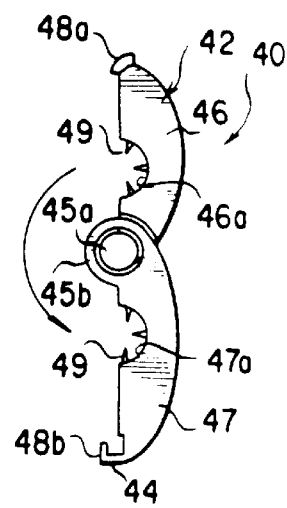

Now, the fifth embodiment of the elongate article coupler of the present invention will be described below with reference to FIGS. 16 and 17. Here, like parts used in the third embodiment described above will be denoted by like reference numerals and will be omitted from the following description. In this embodiment, the elongate article coupler 30b is formed with a plastic material separately of the cord 100 in such a state that opening parts 38 for permitting insertion therethrough of the cord 100 may be formed at first in one lateral part of each of fitting parts 31b, 32b as shown by an alternate dash and double-dot line in FIG. 17. After the cord 100 has been inserted into the opening parts 38, the fitting parts 31b, 32b are thermally deformed to close the opening parts 38 so as to compress the cord 100 and retain it fast as shown in FIGS. 16 and 17. Thereafter, the cord 100 is severed at line X. This embodiment facilitates the fixation and retention of the cord 100 and ensures the retention of the cord with the fitting parts 31b, 32b.

Figure 20:
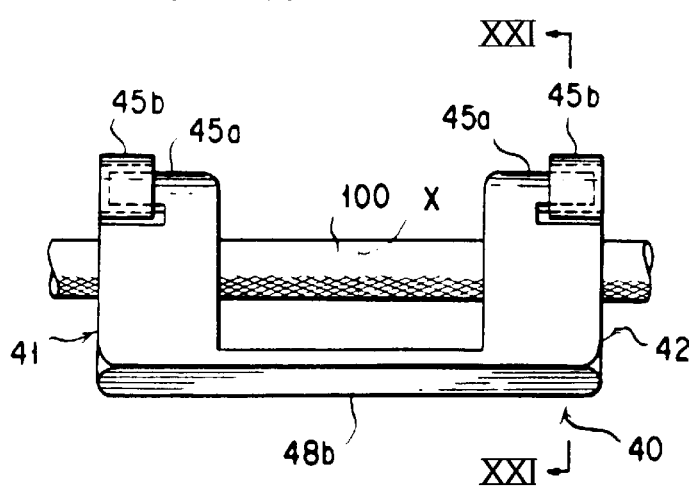
FIG. 20 is a plan view showing the coupler of FIG. 18 as paused for actual use.
Figure 21:
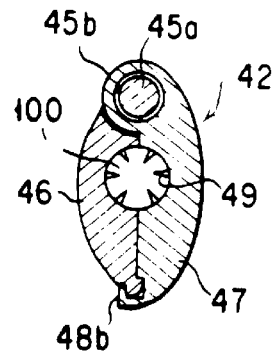
FIG. 21 is a sectional view of the coupler of FIG. 20 taken along line 21—21 without the cord.

Now, the sixth embodiment of the elongate article coupler of the present invention will be described below with reference to FIGS. 18 through 21. In the elongate article coupler 40 of this embodiment, one pair of fitting parts 41, 42 are formed of laterally paired upper members 46 and lower members 47. The upper members 46 and the lower members 47 severally of the fitting parts 41, 42 are connected through the medium of connecting parts 43a, 43b so as to form a one-piece integral entity. The lower end parts of the upper members 46 are bent outwardly to form hinge shafts 45a. In the upper outer edge parts of the lower members 47, bearing parts 45b provided with lateral holes for admitting the hinge shafts 45a are formed. The upper members 46 and the lower members 47 are assembled in a freely swingable state by inserting the hinge shafts 45a of the upper members 46 into the bearing parts 45b of the lower members 47. On generally semicircular inner faces 46a, 47a of the upper members 46 and the lower members 47, needle-shaped projections 49 for retaining the cord are raised upright. A projected ridge part 48a having a generally fan-shaped cross section is formed in the upper end edge of the connecting part 43a of the upper member 46 and an engaging projected part 48b having a generally L-shaped cross section is formed in the lower end edge of the connecting part 43b of the lower member 47 so as to give rise to a breaking part 44 of weak strength at the prescribed portions of the connecting parts 43a, 43b. The cord 100 is fixed to the coupler 40 as shown in FIGS. 20 and 21 by nipping the cord 100 between the semicircular inner faces 46a, 47a of the upper members 46 and the lower members 47 and causing the projected ridge part 48a formed in the one connecting part 43a to be brought into snapping engagement with the L-shaped engaging projected part 48b formed in the other connecting part 43b. The cord once fixed will not easily slip from the coupler 40 because the needle-shaped projections 49 of the coupler 40 are plunged into the cord 100.

The elongate article coupler 40 of this embodiment is put to use after the cord 100 has been fixed and has a cut X inserted between the fitting parts 41, 42 as shown in FIG. 20. This coupler allows the breaking part 44 thereof to be snapped readily on exposure to a tension exceeding a prescribed level, permits easy retention of the cord, and does not discriminate the cord 100 on account of the kind thereof.

Figure 22:
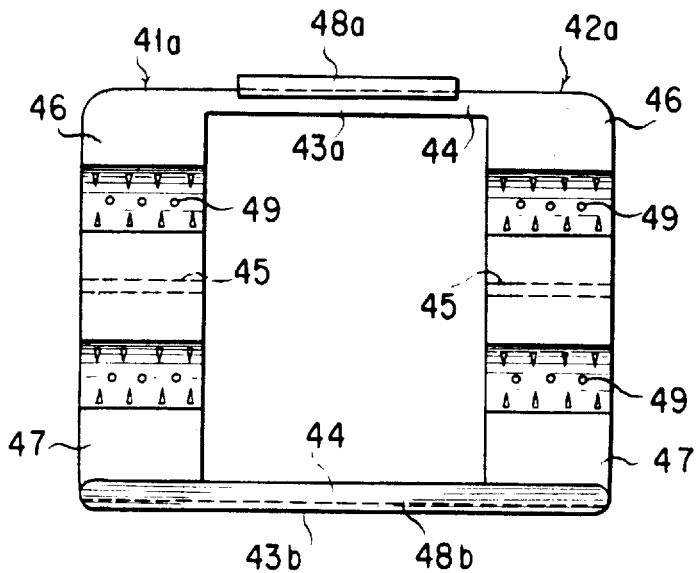
FIGS. 22 and 23 are respectively a plan view and a right side view of the seventh embodiment of the elongate article coupler of the present invention.
Figure 23:
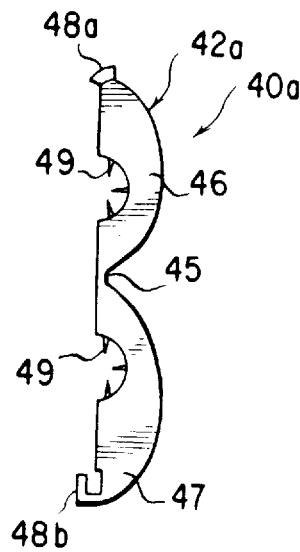

Now, the seventh embodiment of the elongate article coupler of the present invention will be described with reference to FIGS. 22 and 23. Here, like parts used in the sixth embodiment described above will be denoted by like reference numerals and will be omitted from the following description. The elongate article coupler 40a of this embodiment comprises a pair of fitting parts 41a, 42a each formed of upper members 46 and lower members 47, connecting parts 43a, 43b adapted to connect the fitting parts 41a, 42a and formed integrally therewith, and thin-wall hinge parts 45 formed in the central parts about which the upper members 46 and the lower parts 47 are folded over each other. This embodiment facilitates the formation of the coupler 40a and ensures the retention of the cord and the breakage of the connecting parts.

Figure 24:
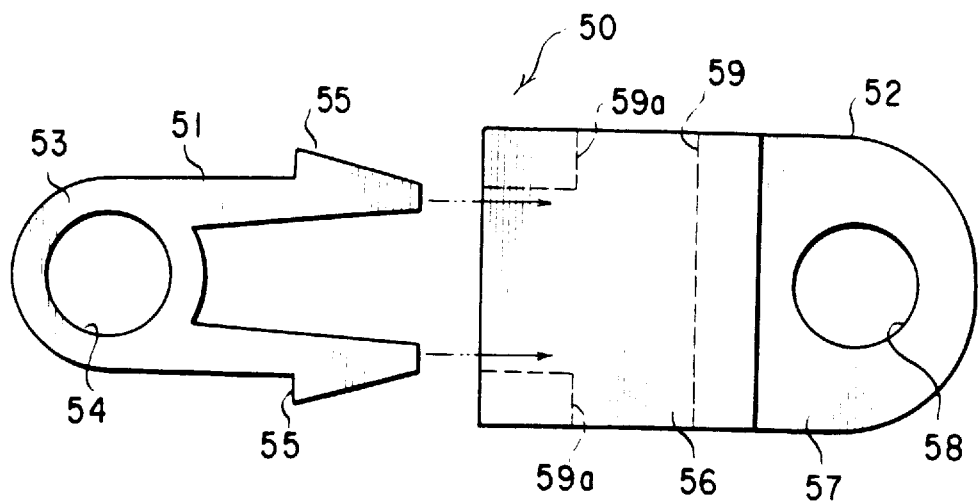
FIGS. 24 and 25 are respectively an exploded plan view and an exploded front view of the eighth embodiment of the elongate article coupler of the present invention.
Figure 25:
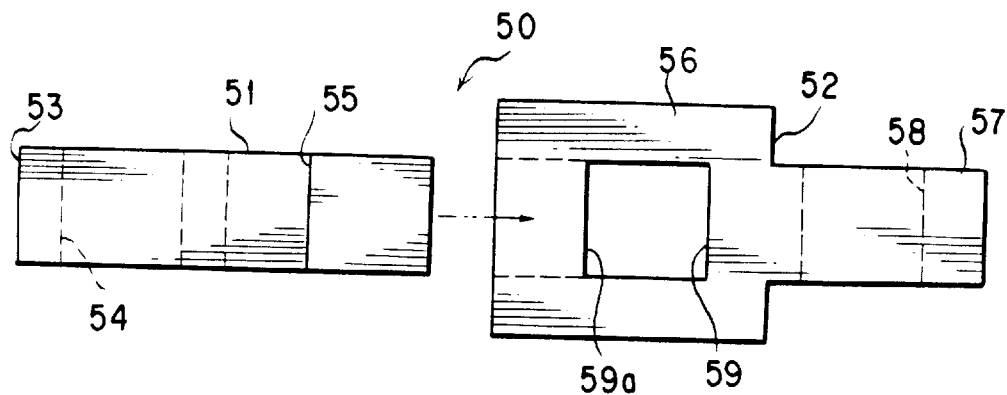

Now, the eighth embodiment of the elongate article coupler of the present invention will be described below with reference to FIGS. 24 and 25. In the elongate article coupler 50 of this embodiment, fitting parts 51, 52 for the cords are formed separately of each other. In an annular main body 53 of the one fitting part 51 and a projecting part 57 of the other fitting part 52, circular holes 54, 58 for passing the cord are respectively formed. The fitting part 51 is a plug member which is provided with a pair of claw-shaped engaging parts 55 projected laterally substantially parallelly and adapted to serve as engaging means. The fitting part 52 is a socket member which is provided in a main body 56 thereof with a T-shaped hole 59 and also provided with a pair of stepped parts 59a adapted to serve as a pair of stopping parts or engaging means.

In the elongate article coupler 50 of this embodiment, the plug member 51 and the socket member 52 are linked to each other by having the end parts of the cords each tied into a knot and respectively fitted to the cord-passing holes 54, 58 and inserting the pair of engaging parts 55 of the plug member 51 into the T-shaped hole 59 of the socket member 52 and thereby allowing the claw-shaped engaging part 55 to be engaged with the stopping parts 59a. When a tension exceeding a prescribed level acts on the cords, the pair of engaging parts 55 slightly swing inwardly and separate from the stopping parts 59a and terminate linkage. This embodiment does not discriminate the cord on account of the kind thereof and ensures infallible engagement and disengagement.

Figure 26:
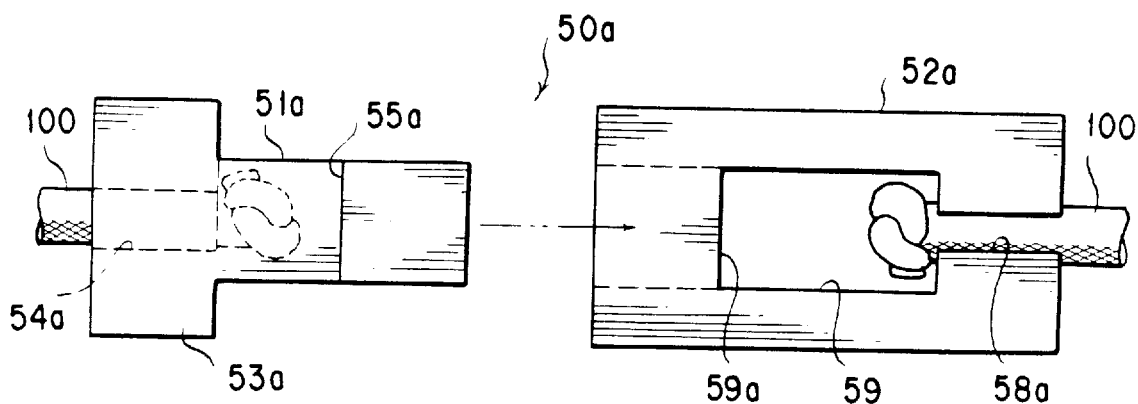
FIG. 26 is an exploded front view of the ninth embodiment of the elongate article coupler of the present invention.
Figure 27:
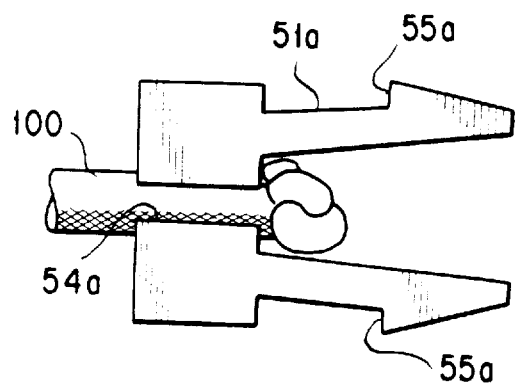
FIG. 27 is a plan view of a plug member of the coupler shown in FIG. 26.

FIGS. 26 and 27 shows the ninth embodiment of the elongate article coupler of the present invention. Here, like parts used in the eighth embodiment described above will be denoted by like reference numerals and will be omitted from the following description. In the elongate article coupler 50a of this embodiment, fitting parts 51a, 52a for the cords are formed separately of each other and the fitting part 51a is formed as a plug member and the fitting part 52a as a socket member. In the upper part of a rectangular main body 53a of the plug member 51a, a slit 54a for the cord extending from the outer lateral face through the gap part between a pair of engaging parts 55a is formed. In one lateral part of a socket member 52a having the shape of an angular cylinder, a slit 58a for the cord extending from the outer lateral face through the T-shaped hole 59 is formed. The coupler 50a is put to use in the same manner as in the eighth embodiment mentioned above, excepting the pair of tied end parts of the cords 100 are passed through the slits 54a, 58a mentioned above and hooked on the plug member 51a and the socket member 52a.

Figure 28:
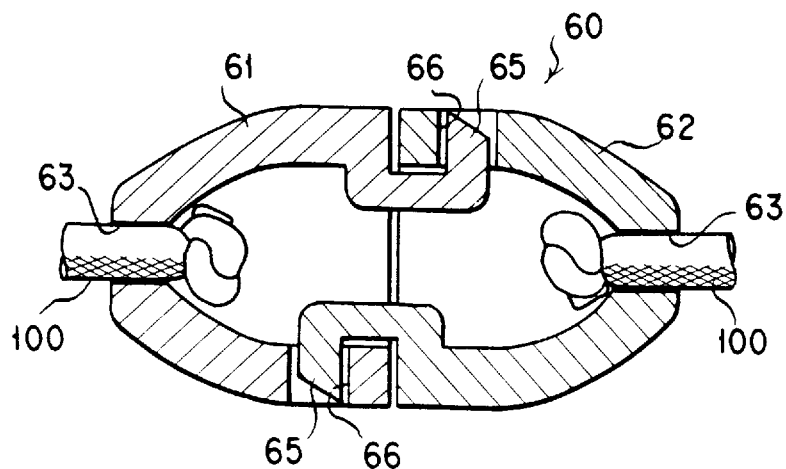
FIG. 28 is a partial sectional view of the tenth embodiment of the elongate article coupler of the present invention.
Figure 29:
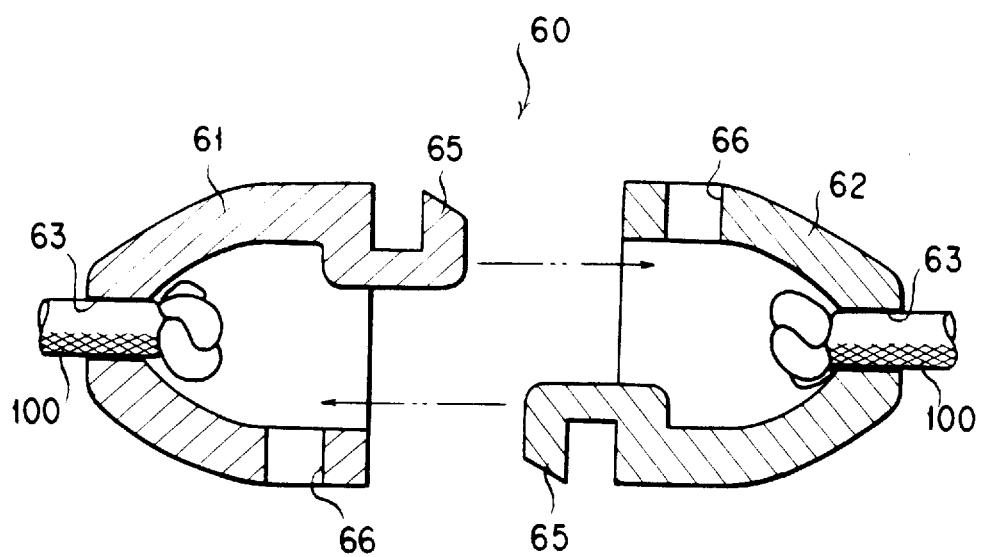
FIG. 29 is an exploded partial sectional view showing the coupler of FIG. 28 as paused in a separated state.

Now, the tenth embodiment of the elongate article coupler of the present invention will be described below with reference to FIG. 28 and FIG. 29. In an elongate article coupler 60 of this embodiment, fitting parts 61, 62 for the cords are formed separately of each other, though in identical cup-like shapes symmetrical relative to an axis of rotation. Each of the fitting parts 61, 62 is provided on the opposed lateral edge parts thereof with a hooked engaging part or protrusion 65 and a stopping hole 66, the hooked engaging part 65 and the stopping hole 66 being adapted to serve as a pair of engaging means. The engaging part 65 and the stopping hole 66 are linked as shown in FIG. 28 by slightly depressing the engaging parts 65 of the fitting parts 61, 62 and inserting them into the relevant stopping holes 66. In the bottom parts of the fitting parts 61, 62, holes 63 for passing the cord are formed. The cords 100 are linked to the fitting parts 61, 62 by inserting each end part of the cords into the hole 63 and tying the leading end part of the cord 100 into a knot.

The elongate article coupler 60 of this embodiment is easy to manufacture because the fitting parts 61, 62 are formed in an identical shape. When a tension exceeding a prescribed level acts on the cords, the engaging parts 65 slightly vibrate and separate from the stopping parts 66 to ensure infallible cancellation of linkage. The present embodiment also does not discriminate the cord on account of the kind thereof and ensures infallible engagement and disengagement.

Figure 30:
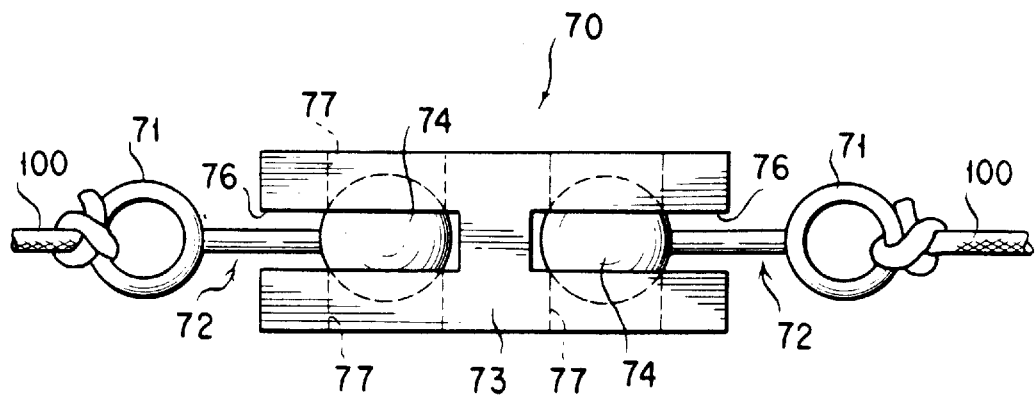
FIG. 30 and FIG. 31 are respectively a front view and a plan view of the eleventh embodiment of the elongate article coupler of the present invention.
Figure 31:
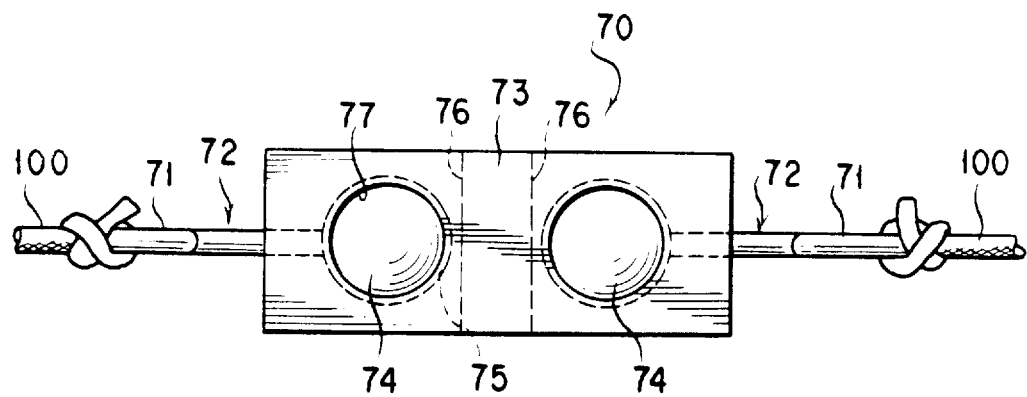

Now, the eleventh embodiment of the elongate article coupler of the present invention will be described below with reference to FIG. 30 and FIG. 31. The elongate article coupler 70 of this embodiment comprises a pair of connecting members 72 each having an annular fitting part 71 for allowing end part of the cord 100 to be tied thereon and a spherical head part 74 interconnected therewith by a rodlike members, and a retaining member 73 for allowing engagement therewith of the head parts 74 serving as stopping means for the connecting members 72. In the retaining member 73, vertically through retaining holes 77 of an inner diameter slightly smaller than the diameter of the head parts 74 are disposed symmetrically on the left and the right side and receiving parts 75 are disposed concentrically with the retaining holes 77 and adapted to serve as stopping means for permitting the head parts 74 to be engaged therewith. In the opposite end parts of the retaining member 73, slits 76 laterally extending from the outer surface through the receiving parts 75 are formed and the retaining holes 77 are made to communicate with the inner sides of the slits 76. The slits 76 are so formed as to be forcibly opened to such an extent as permits insertion of the connecting members 72 therein.

The elongate article coupler 70 of this embodiment is such that when a tension exceeding a prescribed level acts thereon, the head parts 74 of the connecting members 72 forcibly open the slits 76 and ultimately separate from the retaining member 73.

Figure 32:
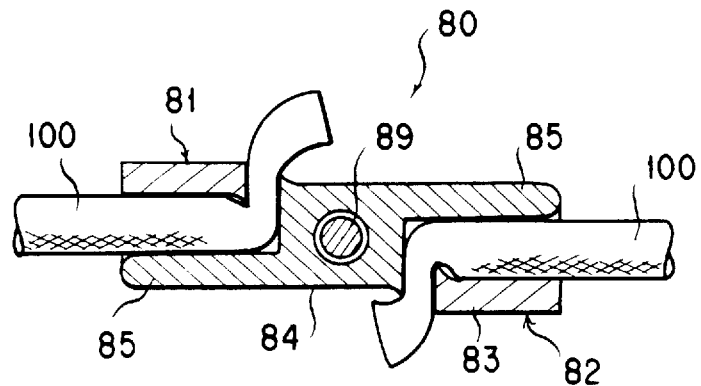
FIG. 32 is a partial sectional view of the twelfth embodiment of the elongate article coupler of the present invention as paused for actual use.

Now, the twelfth embodiment of the elongate article coupler of the present invention will be described below with reference to FIG. 32 and FIG. 33. In the elongate article coupler 80 of this embodiment, one pair of fitting parts 81, 82 connected to the opposite lateral plates 83a (one of which is omitted from illustration) of a retaining member 83 in the left upper edge part and the right lower edge part thereof are formed in a retaining member 83 symmetrically relative to the axis of rotation. In the central part of the retaining member 83, a rotary member 84 serving as means for retaining the cords 100 and cancelling the retention thereof is rotatably attached through the medium of a pivot shaft 89. The rotary member 84 is provided with a pair of pressing parts 85 projecting in the opposite directions from the opposite lateral edges thereof. Grooved parts are so formed one each in the lower part of the fitting part 81 and in the upper part of the fitting part 82 respectively of the retaining member 83 that the pressing parts 85 may be infallibly caused by the rotation of the rotary member 84 to press the cord 100 against the fitting parts 81, 82. On the opposed lateral edges of the fitting parts 81, 82 and the rotary member 84, projecting parts 86, 87 capable of being opposed to each other across the cord and locking it at a fixed position are formed. The projecting parts 86, 87 are enabled to nip the cords 100 as shown in FIG. 32 by inserting the end parts of the cords 100 between the fitting parts 81, 82 and the rotary member 84 as shown in FIG. 33 and then turning the rotary member 84.

Figure 33:
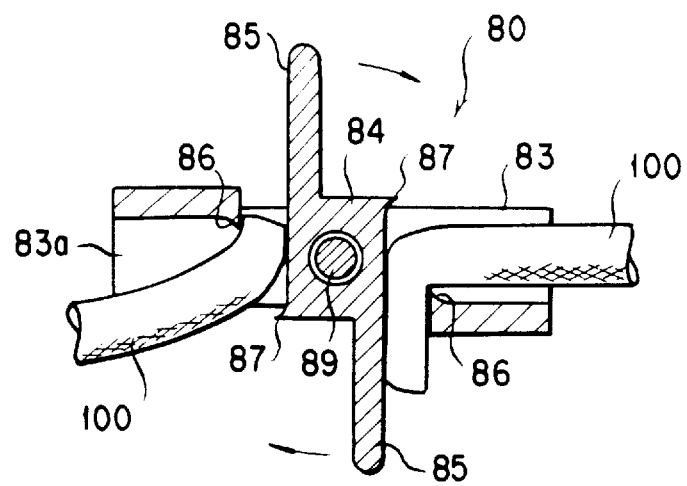
FIG. 33 is a partial sectional view showing the coupler of FIG. 32 as paused for cancellation of the retention of the cord.

The elongate article coupler 80 of this embodiment is such that when a tension exceeding a prescribed level is exerted on the cords 100, the force of the tension acts counterclockwise on the rotary retaining member 84 and consequently imparts a rotation thereto, with the result that the coupler 80 assumes a state shown in FIG. 33 and cancels the retention of the cords 100. This embodiment facilitates retention of the cord and ensures cancellation of the retention of the cord as well.

Figure 34:
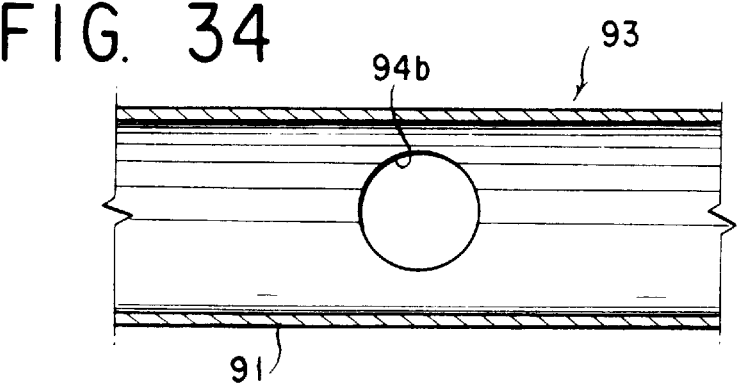
FIG. 34 is a longitudinal sectional view of a retaining member in the thirteenth embodiment of the elongate article coupler of the present invention.
Figure 35:
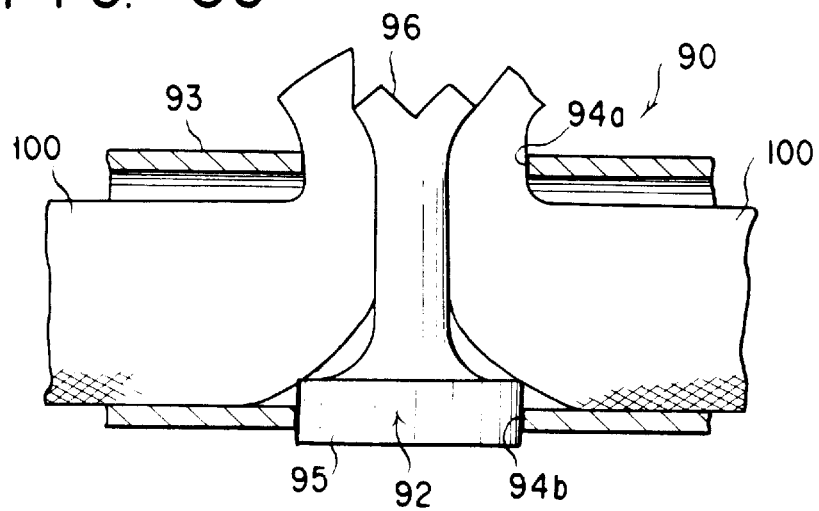
FIG. 35 is a partial sectional view of the thirteenth embodiment of the elongate article coupler of the present invention shown in FIG. 34 as paused for retaining the cord.
Figure 36:
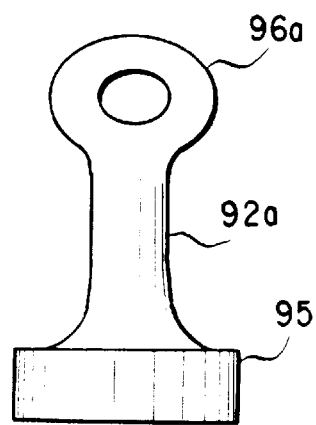
FIG. 36 is a front view showing an example of the modification of a pin in the thirteenth embodiment of the coupler of the present invention.

Now, the thirteenth embodiment of the elongate article coupler of the present invention will be described below with reference to FIG. 34, FIG. 35, and FIG. 36. An elongate article coupler 90 of this embodiment has a cord fitting part 91 formed of a cylindrical retaining member 93, which is perforated to form a pair of opposed through holes 94a, 94b. A pin 92 intended as means for retaining the cord and cancelling the retention is inserted through the through holes 94a, 94b. The pin 92 is provided in one end thereof with a head part 96 flared generally in the shape of a funnel and in the other end thereof with a basal part 95 so enlarged as to be fitted into the through hole 94b and fixed therein. Part of the cord 100 is inserted in a looped state past the through hole 94a and then the pin 92 is fitted into the other through hole 94b, with the result that the cord 100 will be nipped between the through hole 94a and the head part 96 of the pin 92. Thereafter, the looped part of the cord is cut to render the opposite parts of the cord 100 separable from each other. FIG. 36 shows one example of the modification of the pin. A head part 96a of this modified pin 92a has a looped form.

In the elongate article coupler 90 of this embodiment, when a tension exceeding a prescribed level is exerted on the cord 100, the end parts of the cord 100 are made to depress the pin 92 or 92a until the pin 92 or 92a slips from the through hole 94b and cancels the state of engagement. In these couplers, the retaining members enjoy simplicity of construction and allow retention of the cord and cancellation of this retention infallibly.

While certain specific embodiments have been disclosed herein, the invention may be embodied in other specific forms without departing from the spirit or essential characteristics thereof. The described embodiments are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. An elongate article coupler comprising: a pair of symmetrical cup-like fitting members for retaining an end part of an elongate article, each of said members being provided on opposing lateral edge parts thereof with a hole and a hooked protrusion and further in its domed bottom with a through-hole for insertion of said end part of said elongate article, the hook protrusion of each of said members being adapted to be inserted into said hole of the other of said members in such a manner that said hook protrusion separates from said hole when a tension exceeding a prescribed level is exerted on said hook protrusion.

2. The coupler according to claim 1, wherein said cup-like fitting members have an identical shape and structure.

3. An elongate article coupler comprising:

one or more fitting parts for retaining an end part of an elongate article wherein said fitting parts are comprised of a pair of annular fitting parts each having a spherical head part interconnected therewith by a rodlike member; and retention canceling means adapted to induce retention of said elongate article in cooperation with said fitting parts and cancel said retention of said elongate article when a tension exceeding a prescribed level is exerted on said elongate article, said retention canceling means includes a pair of vertical through holes and a pair of slits extending from each outer surface of said retention canceling means into a corresponding hole of said vertical through holes, each of said vertical through holes is adapted to serve as a head part receiving part in cooperation with each of said slits, and each of said slits for insertion of said rodlike member is adapted to be forcibly opened when said tension exceeding said prescribed level is exerted on said annular fitting parts.

4. An elongate article coupler comprising:

fitting parts for retaining an end part of an elongate article, said fitting parts including a retaining member having a pair of opposing fitting parts and a pair of opposite lateral plates interconnecting said fitting parts and a rotary member rotatably attached to said lateral plates at a position between said opposing fitting parts, said rotary member being provided with a pair of pressing parts projecting in the opposite direction from opposite edges thereof; and retention canceling means adapted to induce retention of said elongate article in cooperation with said fitting parts and cancel said retention of said elongate article when a tension exceeding a prescribed level is exerted on said elongate article.

5. An elongate article coupler comprising:

a fitting part for retaining an end part of an elongate article, wherein said fitting part is formed of a cylindrical member having a pair of opposing through holes; and retention canceling means adapted to induce retention of said elongate article in cooperation with said fitting part and cancel said retention of said elongate article when a tension exceeding a prescribed level is exerted on said elongate article, wherein said retention canceling means is a pin having a basal part adapted to be fitted into one of said through holes and a head part projected from said basal part and adapted to be inserted into the other of said through holes to clamp the elongate article in cooperation with said hole.

6. An elongate article coupler comprising:

a pair of fitting parts each for retaining an end part of an elongate article;

a pair of connecting parts disposed between said fitting parts and adapted to interconnect said fitting parts, the connecting parts having breaking parts adapted to be broken under a tension exceeding a prescribed level;

wherein each of said fitting parts comprises an upper member and a lower member, each member having an aligned cavity extending from one end to the other end thereof, said upper member and said lower member closeable together to engage the respective end part of the elongate article; and wherein at least one of said upper and lower members are provided with needle-shaped projections on opposing surfaces of said cavities thereof.

7. An elongate article coupler comprising:

a pair of fitting parts each for retaining an end part of an elongate article; and a pair of connecting parts disposed between said fitting parts and adapted to interconnect said fitting parts, the connecting parts having breaking parts adapted to be broken under a tension exceeding a prescribed level;

wherein each of said fitting parts has a substantially cylindrical shape and includes a slit formed on one lateral part thereof.

* * * * *